INVENTORS
Samuel Lubkin
Norman Nesenoff
Saul Walker
BY [signature]
ATTORNEY

INVENTORS
Samuel Lubkin
Norman Nesenoff
Saul Walker
BY *S.C. Yuter*
ATTORNEY

INVENTORS
Samuel Lubkin
Norman Nesenoff
Saul Walker
BY S.C. Yuter
ATTORNEY

3,350,641
TRANSISTOR TESTING APPARATUS FOR MEASURING THE BETA, LEAKAGE AND CUTOFF CURRENT PARAMETERS
Samuel Lubkin, Bayside, Norman Nesenoff, Syosset, and Saul Walker, Levittown, N.Y.; said Lubkin and said Walker assignors to Digital Electronics Inc., a corporation of New York
Filed Apr. 10, 1963, Ser. No. 271,972
17 Claims. (Cl. 324—158)

This invention pertains to electrical component testing and more particularly to means of and methods for testing signal control devices such as transistors.

Generally, for economic and reliability reasons, it is common practice to fixedly solder transistors to printed wiring boards or similar chassis. While such a practice facilitates production and enhances reliability, particularly in systems subject to vibration, there is the disadvantage of not being easily able to remove a transistor during test or servicing procedures. Even if it were a simple matter to unsolder the leads of the transistor from the terminals of the wiring board, there is still the problem of the heat that is conducted to the transistor elements by way of the leads of the transistor during the unsoldering and resoldering procedure. Heat is a problem because it frequently damages the transistor which is critically heat-sensitive, even though the transistor may have been free of defects before the unsoldering operation took place. Therefore, the servicing of printed wiring boards and similar circuit chassis which employ fixedly soldered transistors is not only difficult, time-consuming and expensive, but quite often results in the damaging of many transistors that were originally free of defects.

The most common defects which occur to transistors are internal short circuits, internal open circuits, excess leakage current and loss of current gain. The leakage current or $I_{co}$ of a transistor circuit is defined as the current flowing in the transistor between the base and collector in a back-biased condition with no current flowing in the emitter. Current gain or Beta is generally defined as the ratio of the collector current to the base current.

The leakage current has been measured by connecting the free unconnected base lead of the transistor via a direct-current microammeter to ground. The emitter is kept floating or unconnected to any voltage or current source and the free collector is connected to a direct-current voltage source to provide the back-biasing. The current measured by the microammeter in this cut-off condition is the leakage current. However, when the transistor is in a circuit the transistor terminals are not isolated and part of the current flowing through the microammeter would be flowing to or from other circuit components connected to these terminals. The measurement would therefore be incorrect.

The Beta varies between different transistor types and also varies at different operating points. The usual method of measuring the alternating-current Beta of a transistor is to bias the transistor to the quiescent collector current desired, apply an input alternating-current signal and then measure the input and output alternating currents. The bias point is determined by adjusting the direct-current potential of the base until the collector current is at the desired value as measured by a direct-current milliammeter in the collector circuit. The ratio of the output alternating-current ($I_{a.c.}$ OUT), as measured by an alternating-current milliammeter in the collector circuit to the input alternating-current ($I_{a.c.}$ IN) as measured by an alternating-current milliammeter in the base circuit determines the Beta. That is:

$$\text{Beta} = \frac{I_{a.c.} \text{ OUT}}{I_{a.c.} \text{ IN}}$$

Presently available transistor testers are capable of measuring the Beta values in circuit as well as out of the circuit. Typical units measure the in-circuit Betas by applying a large alternating-current signal into the base which causes the transistor to switch from an "ON" to an "OFF" state. This introduces second harmonic components in the output or collector circuit. The ratio of the output second harmonic content to the input second harmonic content determines the Beta. This type of system requires a very low harmonic content in the injected alternating-current input signal. Also, because the transistor goes from an "ON" to an "OFF" condition, the Beta measured represents some sort of composite value which does not necessarily correspond to the normal Beta values given in the transistor manufacturers' specification sheets. The operator of present transistor testers must then in some way determine what the proper readings should be. Some values are listed in the transistor tester booklet. However, Betas for any newer transistors would not be listed.

It is accordingly a general object of the invention to provide improved apparatus for and methods of testing signal control devices while connected in circuit.

It is a more specific object of the invention to provide improved apparatus for and methods of measuring certain critical parameters of a transistor fixedly wired in position in a circuit.

It is a further object of the invention to provide improved apparatus for and a method of measuring the leakage current of a transistor in circuit.

It is a still further object of the invention to provide improved apparatus for and a method of measuring the Beta of a transistor in circuit.

It is yet another object of the invention to provide a single apparatus for measuring both the Beta and the leakage current of a transistor in circuit.

It is yet a further object of the invention to provide apparatus for measuring the Beta of a transistor which imposes no severe restriction on the harmonic content of the input alternating-current signal.

It is yet another object of the invention to provide apparatus for measuring Beta directly and at any desired operating collector current, rather than some artificial value over a wide range of currents in the linear and nonlinear transistor operating regions.

It is another general object of the invention to satisfy the above objects by apparatus which while being more safe, convenient and inexpensive, provides more accurate and precise parameter measurements.

Briefly, one aspect of the invention contemplates measuring, in-circuit, a parameter such as the leakage current of transistor having a base, an emitter and a collector connected to a source of operating potentials having output terminals. The source of operating potentials is deenergized and its output terminals are grounded. A voltage equal to a particular voltage is directly applied to the collector of the transistor. A direct current is applied to the base of the transistor. The magnitude of the direct current is varied until no voltage difference is measured between the base of the transistor and ground. The magnitude of the applied direct current measured when there is no potential difference betwen the base and ground is the leakage current of the transistor for the particular collector voltage.

According to another aspect of the invention, there is contemplated the measurement of the current gain of an in-circuit transistor having an emitter, a collector and a base connected to the output terminals of a source of operating potentials. The source of operating potentials is deenergized and the emitter of the transistor is grounded. A direct-current voltage is applied to the collector of the transistor. A bias voltage is applied to the base of the transistor so that a given collector current flows from the collector of the transistor. An alternating-current signal is applied to the base of the transistor and the alternating current from the collector is measured. The alternating current into the base is also measured. The bias voltage is increased to cut off the transistor and the alternating current into the base is again measured. The current gain is the ratio of the measured alternating current from the collector and the difference of the two measured alternating currents into the base.

It should be noted that apparatus for practicing the invention may advantageously measure parameters of transistors either in-circuit or out-of-circuit and apparatus for performing measurements of leakage current and current gain may be incorporated in a single unit.

Other objects, features and advantages of the invention will be apparent from the following detailed description when read with the accompanying drawings wherein.

Figure 1:
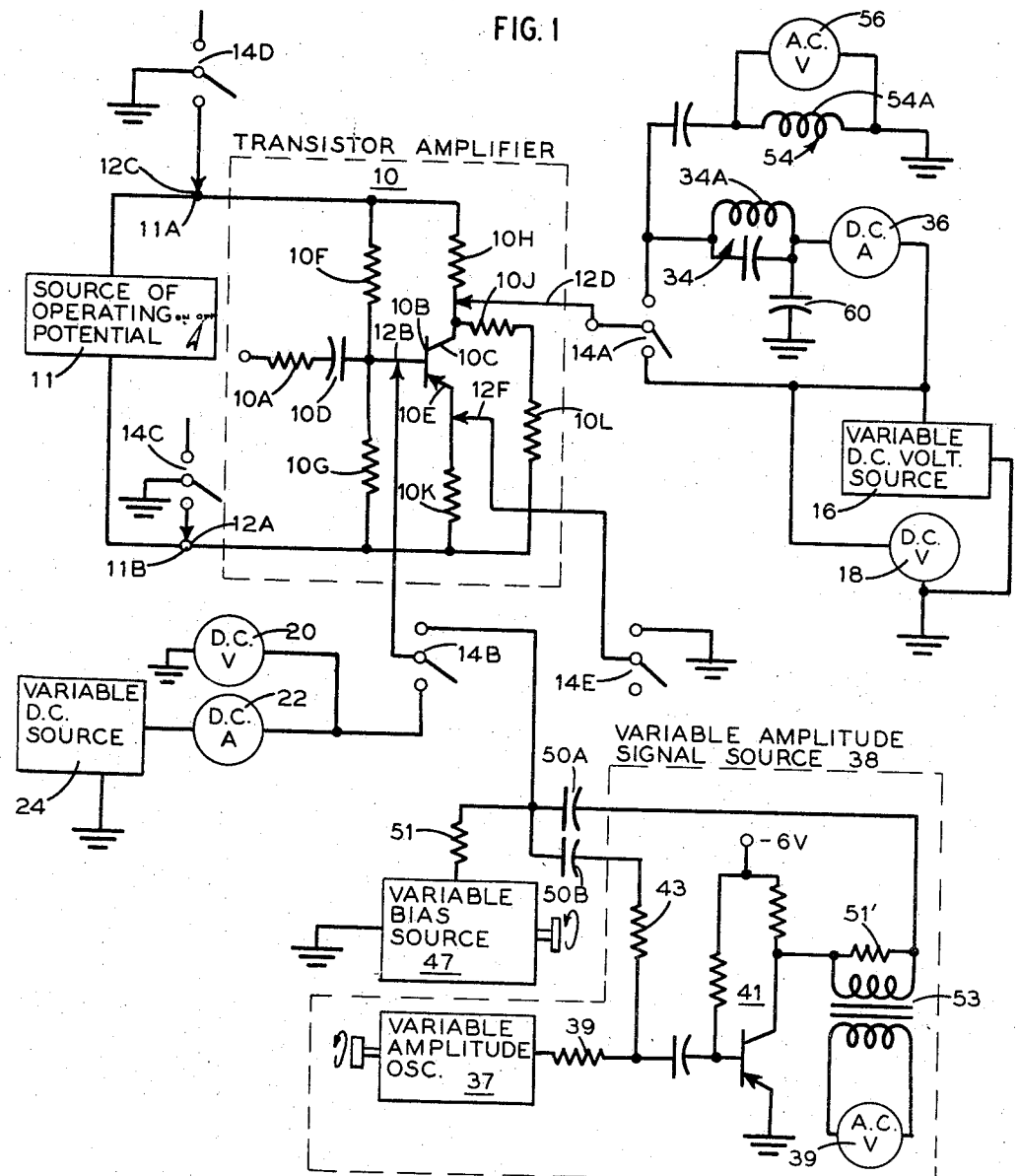
FIGURE 1 is a schematic and block diagram of apparatus for measuring both the leakage current $I_{co}$ and the current gain Beta of a transistor amplifier under test in accordance with a preferred embodiment of the invention.
Figure 4:
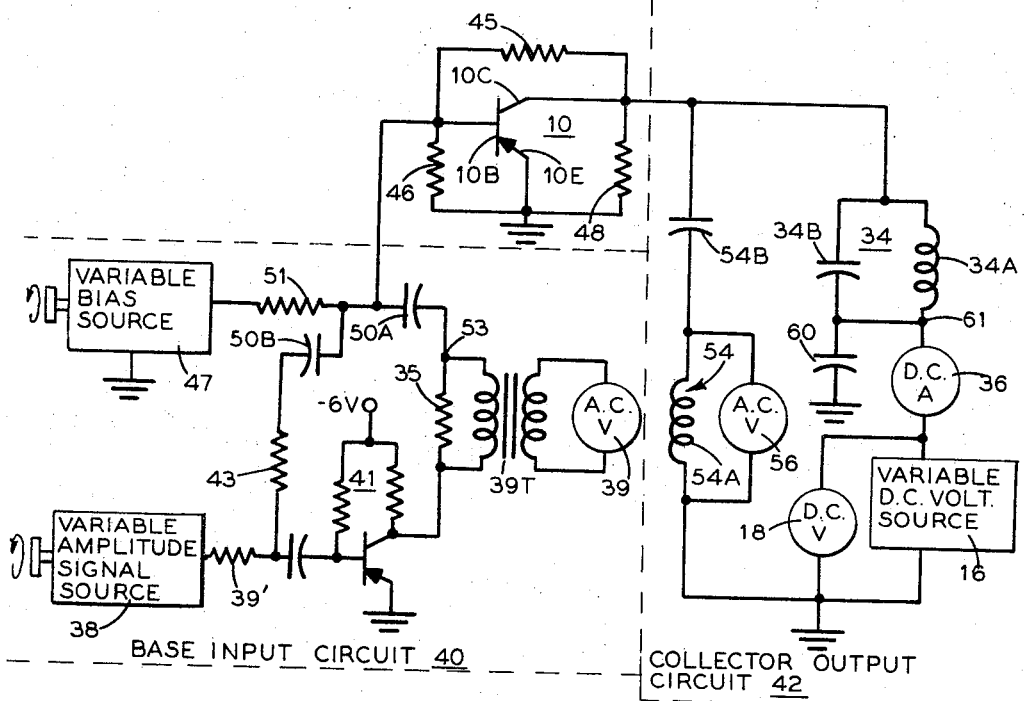
Figure 5:
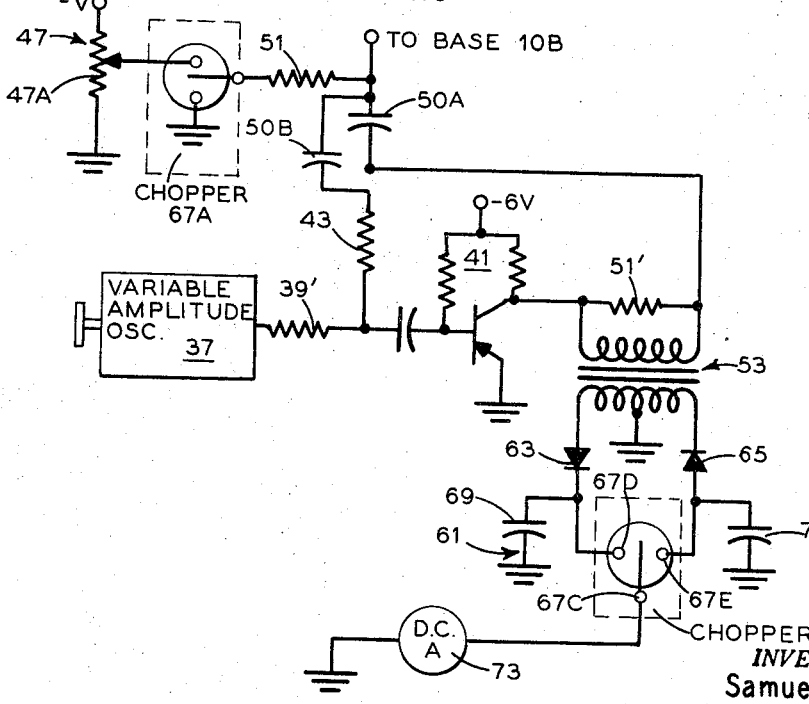

FIGURE 4 is a schematic and block diagram of the equivalent circuit of the portion of the apparatus of FIGURE 1 for measuring the current gain of the transistor amplifier. The apparatus includes a base input circuit which is connected to the base of the transistor under test and a collector output circuit which is connected to the collector of the transistor; and FIGURE 5 is a schematic and block diagram of an automated embodiment of the base input circuit of FIGURE 4.

Referring to FIGURE 1, a transistor amplifier 10 is shown connected to a source of operating potential 11 having output terminals 11A and 11B. The transistor amplifier 10 includes: a transistor having a base 10B, a collector 10C and an emitter 10E, base bias resistors 10F and 10G, a collector resistor 10H; an emitter resistor 10K; an input circuit including resistor 10A and capacitor 10D; and an output circuit including resistors 10J and 10L.

To perform the tests the source of operating potential 11 is either disconnected from the transistor amplifier 10 or is shut off or deenergized. Alligator clips 12 or other suitable means connect the test apparatus to particular portions of the transistor amplifier 10. In particular, the alligator clip 12A (shown for convenience by an arrow in contact with a lead) is connected to one terminal of the source of operating potential 11. The alligator clip 12B is connected at the base 10B of the transistor amplifier 10. The alligator clip 12C is connected to the other terminal of the source of operating potential 11. The alligator clip 12D is connected at the collector 10C of the transistor amplifier 10. The alligator clip 12F is connected at the emitter 10E of the transistor 10.

Switching means 14 comprises a plurality of single-pole, double-throw switches 14A to 14E, inclusive, which are mechanically ganged. When the switching means 14 is in the lower position as shown in FIGURE 1, the leakage current, $I_{co}$, of the transistor amplifier 10 may be measured. In particular, switch 14A connects the collector 10C directly to a variable direct-current voltage source 16 and a direct-current voltmeter 18. Switch 14B connects the base 10B to one terminal of a direct-current voltmeter 20, the other terminal of which is grounded. Switch 14B also connects the base 10B via the series combination of direct-current ammeter 22 and variable direct-current source 24 to ground. Switches 14C and 14D ground the output terminals 11A and 11B of the source of operating potential 11. Switch 14E has no effect on the circuit during measurement of the leakage current. The results of placing the switching means 14 in the position to measure leakage current are more readily seen by referring to FIGURE 2.

By virtue of grounding the terminals of the source of operating potential 11, the external equivalent direct-current circuit of the transistor amplifier 10 under test comprises resistors 26, 28 and 30. In particular, resistor 26 represents the equivalent resistance between the base 10B and ground, resistor 28 represents the equivalent resistance between the emitter 10E and ground, and resistor 30 represents the equivalent resistance between the collector 10C and ground.

The measurement of the cutoff current to be meaningful is taken at a particular collector operating voltage which varies from transistor type to transistor type. Accordingly, the variable direct-current voltage source 16 is adjusted so that the appropriate collector voltage is applied to the collector terminal 10C. The direct-current voltmeter 18, connected in parallel with the variable direct-current voltage source 16, is used to monitor this voltage so that the proper setting is made. It should be noted however that if the circuit tester is to be employed repetitively for measuring the cutoff current for a plurality of transistor amplifiers, each employing the same transistor type, the variable direct-current voltage source 16 and the direct-current voltmeter 18 may be replaced by a fixed direct-current voltage source having an output direct-current voltage equal to the desired collector operating voltage for the transistor type under test.

In any event, after the direct-current voltage is applied it is only necessary to vary the variable direct-current source 24 until there is no potential difference between the base 10B and ground as measured by the direct-current voltmeter 20. When the direct-current voltmeter 20 shows zero, the current flowing through the direct-current ammeter 22 from the variable direct-current source 24 to the base 10B is the leakage current for the transistor for no current is flowing through resistor 26, the only other current sink connected to ammeter 22. As a practical matter, the direct-current voltmeter 20 reads voltages in the millivolt range. Similarly, the direct-current ammeter 22 reads direct-current in the microampere range.

There are some theoretical sources for error in the measurement. For example, if resistor 28 is small as in the case of grounded emitter amplifier there may be a base to emitter current flow within the transistor itself due to the voltage drop across the internal base to emitter resistance of the transistor. However, as a practical matter, this source of error is negligible except for a very few low-current transistor types and even in these cases it is sufficiently small to allow for high accuracy when suitable scale factors are applied.

Another theoretical source of error is encountered when there is an external resistor in the circuit between the base and the collector of the transistor. If such a resistor is present in the transistor amplifier under test, it will be necessary to remove one of its leads connecting either the base 10B or as shown in FIGURE 1, the collector 10C. Even if the resistor is not disconnected the current flow through it can be calculated and subtracted from the actual current flow to obtain the true base current.

A more practical source of error is concerned with the finite sensitivity of the direct-current voltmeter 20. If should be noted that when the voltage of the base 10B with respect to ground is exactly zero, no current at all flows through the resistor 26. However, if there is even a slight undetected voltage across the resistor 26 because of the sensitivity of the direct-current voltmeter 20, current will flow in resistor 26 as well as through the direct-current voltmeter 20. Accordingly, the direct-current ammeter 22 will show a reading which is the sum of the current through the direct-current voltmeter 20, the resistor 26 and the cutoff current through the transistor. However, tests have shown that even when the resistor 26 has a resistance value as low as 150 ohms the error can readily be kept to one percent of a 50 microampere range of the direct-current ammeter 22. It should be apparent that this error can further be minimized by employing electronic millivoltmeters which have a relatively high input resistance and a high sensitivity at the null reading.

A possible limitation for the test under consideration can be the magnitude of the resistor 30. If this resistor is small, current in it from the variable direct-current voltage source 16 may cause an overload. However, this possibility is unlikely in most transistor amplifier circuits, but may occur in very specific transistor circuits of the emitter-follower configuration. Even if the resistance of resistor 30 is as low as 100 ohms and a six volt source is employed, the source need then supply 60 milliamperes, which will not overload a reasonable size power supply. Accordingly, except for some very specific rare occurrences, the apparatus of FIGURES 1 and 2 and the method disclosed therewith can provide a highly reliable and extremely precise measurement of the cutoff current in a transistor amplifier.

The leakage current measurement may be summarized by the fact that when all operating voltage sources are grounded and the base voltage of the transistor is forced to zero, the current measured in a path from a current source to the base is the true leakage current.

Figure 2:
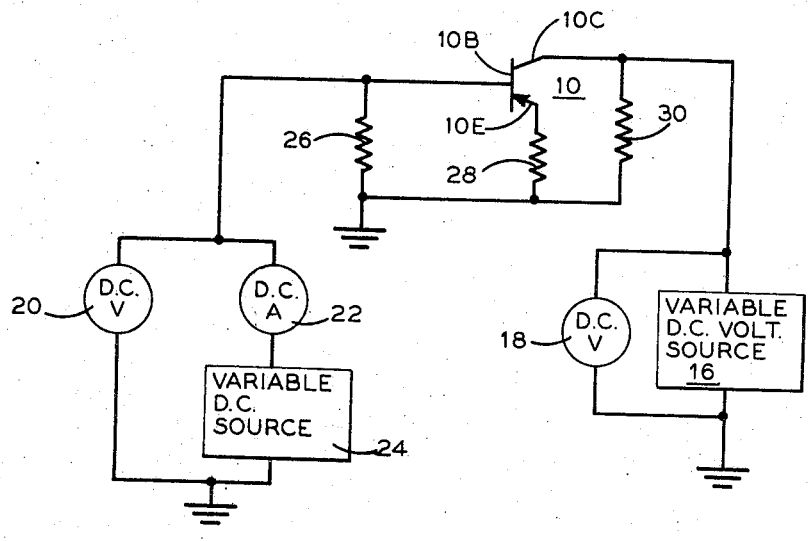
FIGURE 2 is a schematic and block diagram of the pertinent portions of the apparatus of FIGURE 1 for measuring the leakage current of the transistor amplifier with the equivalent representation of its external circuit.

It should be noted that the apparatus of FIGURE 2 contemplates the manual manipulation of the variable direct-current source 24 to establish the zero potential drop across the resistor 26. However, in accordance with another embodiment of the invention, the method of FIGURE 2 can be performed automatically by the apparatus of FIGURE 3, wherein corresponding elements bear the same reference characters as in FIGURE 2.

Figure 3:
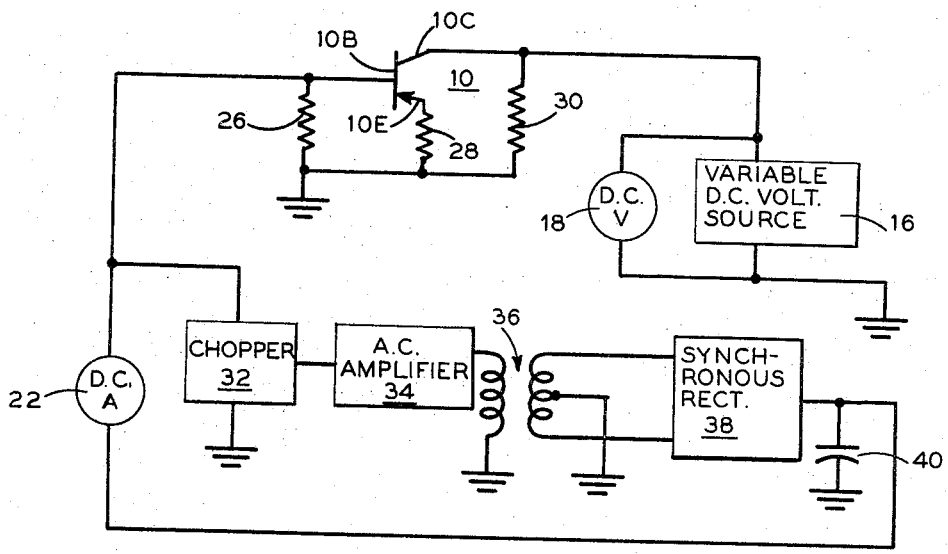
FIGURE 3 is a schematic and block diagram of an automated embodiment of the invention incorporated in the apparatus of FIGURE 1 wherein the measurement of the leakage current is completely automatic.

In particular, the output circuit connected to the collector 10C of FIGURE 3 is identical to the output circuit connected to the collector 10C of FIGURE 2 and performs the same function. Therefore, this output circuit will not be further described. The circuit connected to the base 10B of FIGURE 3 replaces the circuit connected to the base 10B of FIGURE 2. In particular, the chopper 32, of conventional design, generates an alternating current error signal whose amplitude is proportional to the difference in the voltage at the base 10B and ground. This alternating-current error voltage is amplified by the alternating-current amplifier 34 and is fed to transformer 36 for full wave rectification by synchronous rectifier 38, also of conventional design. The output of synchronous rectifier 38, after being filtered by capacitor 40, feeds direct current through direct-current ammeter 22 to the base 10B of the transistor 10. The amplitude and polarity of the current fed from synchronous rectifier 38 is such as to minimize the direct-current voltage difference between the base 10B and ground potential and this difference can be made as small as desired within present engineering capabilities by designing the alternating-current amplifier 34 to have suitable high gain characteristics. Accordingly, it should be noted that the combination of chopper 32, alternating current amplifier 34, transformer 36, synchronous rectifier 38 and filter capacitor 40′ comprise an automated servo system which replaces not only the variable direct-current source 24 and the direct-current voltmeter 20 of the apparatus of FIGURE 2 but also the manipulations and judgment of an operator.

While the basic underlying concept of the circuit tester is to constrain current to follow desired test paths without significant diversion along other paths which exist in the circuit of the transistor under test by making the effective impedance of the test path very small or zero, sometimes the nature of the test or the circuit configuration under test cannot permit such an approach. For example, in the description of the test for the leakage current it was seen that it was necessary to ground the outputs of the source of operating potential 11 of FIGURE 1. Sometimes it may be necessary to keep potentials operating in the circuit. Furthermore, it should be noted that when a resistor or other direct-current conducting component is connected between the collector and the base, it may be necessary to disconnect one lead of this resistor from the circuit. Again, under some circumstances it may be impractical or actually unreliable to disconnect a portion of the circuit. In such cases, the approach taken is to perform two measurements. One measurement is made of the current which flows in both the desired and undesired paths and another measurement with the same voltage measurement as in the first measurement but with the current in the desired path being blocked. Accordingly, the difference in the two measurements is then used as the test current. In other words, the second measurement is subtracted from the first measurement with the remainder representing the current flowing in the desired path. Such a situation arises in the measurement of the current gain Beta of a transistor.

Returning to FIGURE 1, when the test for the measurement of current gain is to be performed, the switching means 14 is shifted to its upper position. Accordingly, switch 14A connects the collector 10C to the variable direct-current voltage source 16 via the parallel inductor-capacitor network 34 and the direct-current ammeter 36. Switch 14B connects the base 10B to the variable amplitude signal source 38 via the coupling capacitor 42 and via resistor 51 to the variable bias source 47. Switches 14C and 14D unground the output terminals of the source of operating potential 11, although for this measurement it makes no difference whether these output terminals are grounded or not. Finally, the switch 14E connects the emitter 10E directly to ground.

It should be noted that if only the current gain is to be tested, there is no need to connect the alligator clips 12A and 12C to the output terminals 11A and 11B of the source of operating potential 11. However, for the current gain measurement it is necessary that the emitter 10E be grounded. Therefore, if only a current gain measurement is to be performed, switch 14E may be bypassed and the alligator clip 12F can be connected directly to ground.

In any event, FIGURE 4 shows the result of moving the switching means 14 to its upper position for measuring the current gain of the transistor amplifier 10. In particular, the base input circuit 40 is connected to the base of the transistor 10B and the collector output circuit 42 is connected to the collector 10C. Base input circuit 40 includes: a variable bias source 47 connected via resistor 51 to the base 10B; variable amplitude signal source 38 connected via resistor 39′ to feedback transistor amplifier 41; resistor 35 connecting the output of amplifier 41 via capacitor 50A to base 10B; resistor 43 is the feedback resistor; and transformer 39T coupling the signal developed across resistor 35 to alternating-current voltmeter 39. Collector output circuit 42 includes the low impedance circuit 54 comprising inductor 54A and capacitor 54B connecting collector 10C to ground; alternating-current voltmeter 56 connected in parallel with inductor 54A; the serially connected high impedance circuit 34, direct-current ammeter 36 and variable direct-current voltage source 16 connecting collector 10C to ground; the capacitor 60 connecting junction 61 to ground; and the direct-current voltmeter 18 in parallel with voltage source 16.

It should be noted that this equivalent external circuit is different from the equivalent external circuit of the transistor amplifier 10 for the measurement of the leakage current. In particular, the resistor 45 represents the resistance between the base 10B and the collector 10C, the resistor 46 represents the external resistance between the base 10B and the emitter 10E and the resistor 48 represents the external resistance between the collector 10C and the emitter 10E.

Initially, the variable direct-current voltage source 16 is adjusted to the desired collector operating potential as indicated by the direct-current voltmeter 18. Variable bias source 47 (a direct-current voltage) is adjusted until the desired quiescent operating collector current is obtained as measured by direct-current ammeter 36 in the collector output circuit 42. This is necessary since the measurement of current gain is a function of the quiescent operating collector current and voltage.

The operating collector current is established as follows: Variable bias source 47 is adjusted to insure that transistor amplifier 10 is cut-off. A first reading is taken of the current flowing through direct-current ammeter 36. The current is then due to current paths external to the transistor such as resistors 45, 46 and 48. Variable bias source 47 is then adjusted for conduction and in particular until a reading is obtained on direct-current ammeter 36 which is equal to the sum of the first reading plus the desired operating collector current. However, it should be noted that if the same type of circuit is to be repetitively tested, the variable direct-current voltage source 16, the direct-current ammeter 36, the direct-current voltmeter 18 and the variable bias source 47 may be dispensed with and replaced by a direct-current voltage source of a given magnitude to supply the operating collector voltage and a voltage source of a given magnitude to supply the required operating bias potential to produce the desired quiescent collector current.

The variable amplitude signal source 38 is then adjusted to feed an alternating-current signal to the base 10B. The amplitude of this signal is of any convenient value. However, it is desirable to adjust this amplitude so that the alternating-current voltmeter 56 reads a signal which is conveniently as small as possible consistent with the ability to be read. This will be called the set reading. The signal measured by alternating-current voltmeter 39 is proportion to the alternating current flowing from variable amplitude signal source 38 via coupling capacitor 50B to the base 10B. The magnitude of this signal is noted. The signal measured by alternating-current voltmeter 56 is then proportional to the alternating current flowing from the collector 10C, i.e. $I_c$.

The voltage measured by the alternating-current voltmeter 39 is then proportional to a current denominated $I_{b2}$. After these measurements are made and recorded, variable bias source 47 is adjusted to cut off the base 10B of the transistor amplifier 10, so that in spite of the fact that a signal is fed to the base of transistor 10B the potential of the base is such that the transistor 10 remains cut off. The variable amplitude signal automatically maintains amplitude in this condition and the alternating-current voltmeter 39 will read a signal proportional to a current denominated $I_{b1}$. This current is actually the current through all paths external to the transistor 10. Therefore, the true base current, that is the current passing into the base 10B of the transistor amplifier 10, is the difference between $I_{b2}$ and $I_{b1}$ and the current gain of the transistor is indicated by the following formula:

$$\text{Current gain} = \text{Beta} = I_c/I_b$$

But $I_b = I_{b2} - I_{b1}$; and $I_c = k_1 E_c$, where $E_c$ is the reading on voltmeter 56 (a constant) and $k_1$ is a constant $I_{b2} = k_2 E_b$, where $E_b$ is the reading on voltmeter 39 with the transistor not cut off and $k_2$ is a constant $I_{b1} = k_2 E'_b$, where $E'_b$ is the reading on voltmeter 39 with the transistor cut off Therefore, $$\text{Beta} = C \frac{E_c}{E_b - E'_b} = \frac{K}{E_b - E'_b}$$

since $E_c$ is a constant.

Accordingly, if the scale of alternating-current voltmeter 39 is calibrated to take into account the constant K as well as the inverse proportionality, and be movable so that its initial (infinity) point can be shifted to the pointer position corresponding to the $E'_b$ reading, the scale reading at the pointer position corresponding to the $E_b$ reading will give the true Beta of the transistor directly.

Variable amplitude signal source 38 (FIGURE 4) includes a variable amplitude oscillator 37 connected via resistor 39' to feedback amplifier 41, feedback being provided by resistor 43. The current output of feedback amplifier 41 is converted to a voltage source by resistor 35 and is stepped up by transformer 39T for measurement by alternating-current voltmeter 39. Resistors 39' and 43 are chosen so that the feedback amplifier 41 has fixed gain and constant output for changing loads so that the magnitude of the alternating-current voltage fed to base 10B is the same regardless of whether the transistor amplifier 10 is or is not cut off. This amplifier is assumed to have a sufficiently high gain so that the change in current in resistor 43 is negligible compared to that in resistor 35. Step-up transformer 39T is employed to provide a conveniently high voltage to alternating-current voltmeter 39 without loading the amplifier.

If a low-impedance alternating-current microammeter were available, it could be substituted for resistor 35 and the transformer omitted. The configuration of FIGURE 4 is preferred for another reason. In some embodiments, it is desirable to use the same meter for both functions performed by the alternating-current voltmeters 56 and 39, switching it to each position as needed. This may be done more conveniently with high impedance voltmeters than with meters that read current directly.

Various factors involved in this measurement will now be considered in detail. The frequency of the signal generated by the variable amplitude signal source 38 is chosen to be in the kilocycle range. A typical value would be one kilocycle per second. The parallel inductor-capacitor network 34 (FIGURE 4) is designed to resonate at the frequency of the alternating-current signal. Similarly, the series inductor-capacitor network 54 is also chosen to resonate at that frequency. Accordingly, the network 34 presents a theoretically infinite impedance (parallel resonance) to the output of the collector 10C, while the network 54 presents an extremely low impedance (series resonance) to that output. Therefore, theoretically, the fundamental component of alternating current from the collector 10C should pass through the network 54. In practice, some current doesn't. To ensure that only a negligible portion of the fundamental component of the alternating current does not pass through this network 54, a high resistance alternating-current voltmeter 56 measures the signal across inductor 54A. Reactive impedance, if low loss, can be compensated by modifying the magnitudes of inductor 54A and capacitor 54B appropriately. A series connected milliammeter could be used instead if sufficiently low loss but this is less convenient if it is desired to use the same meter for the function of alternating current meter 39 as well by switching it from one place to the other. Accordingly, substantially all of this current passes through the inductor 54A and a negligible amount passes through the network 34 or the resistors 45 and 48. It should be noted however that the higher harmonics of the output alternating-current can pass through the network 34. Capacitor 60 provides a low impedance path to shunt these harmonics to ground, preventing their being blocked by the relatively high impedance of the direct-current ammeter 36 to alternating current.

The direct-current collector current passes through the direct-current ammeter 36 (a milliammeter). If the inductor 34A in the network 34 has a suitably low resistance component and the resistance in the direct-current ammeter 36 is also of low value, then the direct-current voltmeter 18 truly reads the quiescent collector voltage within the tolerances of the remaining components of the circuit. It should be noted that the direct-current ammeter 36 reads a direct current which is higher than the true quiescent collector current by virtue of the fact of direct current flowing in the resistors 45 and 48. However, this error is generally slight for the usual values of these resistances and in any event the current gain does not change noticeably for moderate changes in the quiescent collector current. The order of error is indicated by the reading of direct-current ammeter 36 when the transistor under test is cut off. If important, a correction may be made by taking the difference in readings with normal and cutoff bias.

Consider now the factors concerned with the base input circuit 40. Capacitors 50A and 50B serve to isolate the various sections as concerns direct current. They are chosen of sufficiently large capacitance as not to interfere materially with the operation of amplifier 41. It should be noted that the alternating-current voltmeter 39 not only indicates the alternating current fed to the base 10B but also alternating current in various parallel paths such as a path including the resistor 51, the path comprising the resistors 45 and 48, and the path presented by the resistor 46. However, when the transistor amplifier 10 is cut off, the actual alternating base current is cut off but the alternating current through these external paths is still present. Therefore, the difference as measured in the manner hereinbefore described gives a measure of the true base alternating current.

The apparatus of FIGURE 4 may be automated to a considerable degree in accordance with another embodiment of the invention, by replacing the base input circuit 40 with the circuit of FIGURE 5 wherein the identical components bear the same reference characters as in FIGURE 4 and accordingly will not be further described. The variable bias source 47 can include a potentiometer 47A connected between ground and a voltage —V. The potentiometer 47A is adjusted to the required operating bias voltage. Chopper 67A of conventional design, comprises a common contact connected to resistor 51, a first fixed contact connected to the wiper arm of potentiometer 47A, and a second fixed contact connected to ground. Accordingly, a cutoff bias and an operating bias are alternated applied to base 10B via resistor 51. It should be noted as hereinafter described, chopper 67A is one half of a double chopper 67.

Alternating-current voltmeter 39 of FIGURE 4 is replaced by the Beta indicating network 61 of FIGURE 5. In particular, each of the legs of the secondary winding of transformer 53 is connected via oppositely polarized diode 63 and 65 to contacts 67D and 67E respectively of chopper 67B, the other half of the double chopper 67. Filter capacitors 69 and 71 are also connected between fixed contacts 67D and 67E respectively and ground. Common contact 67C of chopper 67B is connected via direct-current ammeter 73 to ground. It should be noted that chopper 67B operates in synchronism with chopper 67A by virtue of the fact that their common or moving contacts are mechanically ganged together.

The circuit of FIGURE 5 operates as follows. When the common contact of chopper 67A is in the up position, the common contact 67C of chopper 67B is connected to the fixed contact 67D of chopper 67A. Operating bias is applied to the base 10B of the transistor 10 of FIGURE 4. Accordingly, a first magnitude of alternating current ($I_{b2}$) is fed from feedback amplifier 41 of FIGURE 5 via capacitor 50 to base 10B. This current develops an alternating-current voltage across resistor 51'. The alternating-current voltage is half wave rectified by diode 63, the positive lobes passing therethrough, and filtered by capacitor 61 to provide a positive direct current fed to direct-current ammeter 73. When the choppers 67A and 67B switch, ground potential is fed via resistor 51 to base 10B, cutting off the transistor 10 and direct-current ammeter 73 is connected to diode 65. Since transistor 10 is now cut off, a smaller current is supplied by feedback amplifier 41. Consequently, an alternating-current voltage of smaller magnitude is developed across resistor 51'. This smaller magnitude alternating-current voltage is half-wave rectified by diode 65 (its negative lobes passing therethrough) and filtered by capacitor 71. Accordingly, a negative direct current is fed to direct-current ammeter 73. Because of the inertia in the ammeter 73 and the switching rate of the chopper 67, a subtraction operation is performed with direct-current ammeter 73 indicating the difference current. If the scale of direct-current ammeter 73 is calibrated to take into account all proportionality factors then the true Beta of the transistor can be directly indicated.

The following table gives the percentage error in measurement of Beta under in-circuit conditions as represented by resistors connected between the terminals of a type 2N1681 transistor with an operating collector voltage of 6 volts and an operating collector current of 10 milliamperes:

| Resistance between collector and emitter | Resistance between collector and base | Resistance between base and emitter | Percentage error |
|---|---|---|---|
| 100 ohms | Infinite | Infinite | 9.3 |
| Infinite | 1,500 ohms | Infinite | 8.0 |
| Infinite | Infinite | 500 ohms | 1.5 |
| 100 ohms | 1,500 ohms | 500 ohms | 6.8 |

It should be noted that the errors are all less than ten percent even when a collector to base resistance is included.

The measurement of leakage current is even more remarkable. The in-circuit measurement was performed by a circuit equivalent to that of FIGURE 2 wherein the variable direct-current voltage source 16 was 6 volts and the variable direct-current source 24 was 100 milliamperes. The resistor 28 could be varied from zero to infinity without any detectable error in measurement. The resistor 30 could be varied from infinity to about 100 ohms without any error, the lower limit of resistance being determined by the variable direct-current voltage source 16 and the variable direct-current source 24. The magnitude of resistor 26 had some effect on the measurement. For a type 2N301 transistor with a 6-volt collector potential there is an out-of-circuit leakage current of 73 microamperes.

The following table shows the effect of variations in the magnitude of resistor 26 for a type 2N301 transistor with a collector voltage of 6 volts.

Magnitude of resistance 26: Leakage current in microamperes
Infinity _____ 73
10,000 ohms _____ 73
1,000 ohms _____ 72
100 ohms _____ 76
22 ohms _____ 60

While only a limited number of embodiments of the invention have been shown and described in detail, there will now be obvious to those skilled in the art many modifications and variations which do not depart from the spirit of the invention. In particular it is possible by suitable switching arrangements to simplify the number of meters employed in the apparatus of FIGURE 1. However, such switching arrangements will in no way depart from the spirit of the invention.

What is claimed is:

1. Apparatus for measuring the cutoff current for a particular collector voltage of a transistor, in situ, said transistor including emitter, collector and base terminals, a deenergized source of operating potentials including output terminals and coupling means for coupling the output terminals of said source of operating potentials to the terminals of said transistor, said apparatus comprising a reference potential means, means for connecting the output terminals of said source of operating potentials to said reference potential means, means for applying a direct-current voltage equal to the particular collector voltage with respect to said reference potential means directly to said collector, impedance means for connecting said base, emitter and collector terminals respectively to said reference potential means, means for generating a direct-current error signal proportional to the difference in the direct-current voltage of said base and said reference potential means voltage, a direct-current ammeter having first and second terminals, means for connecting said first terminal to said error signal generating means and said second terminal to said base whereby the direct current measured by said direct-current ammeter indicates the cutoff current.

2. The apparatus of claim 1 wherein said error signal generating means comprises a chopper having a first input connected to said base, a second input connected to said reference potential means and an output, an alternating-current amplifier having an input connected to the output of said chopper and an output, and rectifier means having an input connected to the output of said alternating-current amplifier and an output connected to the first terminal of said direct-current ammeter.

3. The apparatus of claim 1 wherein said error signal generating means comprises a chopper having a first input terminal connected to said base, a second input terminal connected to said reference potential means and an output terminal for generating an alternating-current signal having a magnitude proportional to the difference in direct-current voltages present at said first and second input terminals, an alternating-current amplifier having an input terminal connected to the output terminal of said chopper, a transformer having a primary winding connected to the output of said alternating-current amplifier and a center-tapped secondary winding including two legs, means for connecting the center tap of said secondary winding to said reference potential means, and a synchronous rectifier having first and second input terminals connected respectively to the legs of said secondary winding and an output terminal connected to the first terminal of said direct-current ammeter.

4. A method for measuring the leakage current for a particular collector voltage of a transistor amplifier, in situ, said transistor amplifier including emitter, collector and base terminals, a source of operating potentials including output terminals and coupling means for coupling the output terminals of said source of operating potentials to the terminals of said transistor, said method comprising the steps of deactivating said source of operating potentials, connecting the output terminals of said source of operating potentials to ground, connecting the emitter terminal of said transistor to ground, applying directly to said collector a voltage with respect to ground which is equal to the particular collector voltage, measuring the voltage of said base with respect to ground, applying a direct current to said base, changing said applied direct current until no voltage difference is measured between said base and ground, and measuring said applied direct current, the magnitude of the applied direct current when there is measured no voltage difference between said base and ground being the leakage current for said particular collector voltage.

5. Apparatus for measuring the current gain of a transistor, in situ, said transistor including a base, an emitter and a collector, said apparatus comprising a series inductor-capacitor network for connecting said collector to ground, first alternating-current measuring means connected to said series network, a parallel inductor-capacitor network having first and second terminals, means for connecting said first terminal to said collector, a direct-current voltage source having first and second terminals, means for connecting the first terminal of said voltage source to the second terminal of said parallel inductor-capacitor network, means for grounding the second terminal of said voltage source, means for connecting the emitter of said transistor to ground, a chopper having a common terminal and first and second fixed terminals, means for connecting the common terminal of said chopper to said base, a cutoff bias voltage source connected in series between the first terminal of said chopper and ground, voltage means for connecting ground to the second fixed terminal of said chopper, a constant voltage feedback amplifier having an input terminal and an output terminal, a variable amplitude signal source having an output terminal, means for connecting the output terminal of said variable amplitude signal source to the input terminal of said feedback amplifier, means for connecting the output terminal of said feedback amplifier to said base and second alternating-current measuring means connected to the output of said feedback amplifier.

6. Apparatus for measuring the current gain of a transistor, in situ, said transistor including a base, an emitter and a collector, said apparatus comprising a series inductor-capacitor network for connecting said collector to ground, alternating-current measuring means connected to said series network, a parallel inductor-capacitor network having first and second terminals, means for connecting said first terminal to said collector, a direct-current voltage source having first and second terminals, means for connecting the first terminal of said voltage source to the second terminal of said parallel network, means for grounding the second terminal of said voltage source, means for connecting the emitter of said transistor to ground, a first chopper having a common terminal and first and second fixed terminals, means for connecting the common terminal of said first chopper to said base, means for connecting ground to said first fixed terminal, a cutoff bias source connected between ground and said second fixed terminal, a constant voltage feedback amplifier having an input terminal and an output terminal, means including a resistor for connecting the output terminal of said feedback amplifier to said base, a transformer having a primary winding and a secondary winding, said primary winding being connected across said resistor, a second chopper operating in synchronism with said first chopper and including a common terminal and first and second fixed terminals, first and second filter capacitors connecting respectively the fixed terminals of said second chopper to ground, a first diode polarized in a first direction for connecting the first fixed terminal of said second chopper to one leg of said secondary, a second diode polarized in the opposite direction for connecting the second fixed terminal of said second chopper to the other leg of said secondary, and a direct-current ammeter for connecting the common terminal of said second chopper to ground.

7. The apparatus of claim 6 wherein said alternating-current measuring means is an alternating-current voltmeter connected across the inductor of said series inductor-capacitor network.

8. Apparatus for measuring the current gain of a transistor, in situ, said transistor including a base, an emitter and a collector, said apparatus comprising a series inductor-capacitor network for connecting said collector to ground, an alternating-current voltmeter connected across the inductor of said series network, a parallel inductor-capacitor network having first and second terminals, means for connecting said first terminal to said collector, a direct-current ammeter having first and second terminals, means for connecting the first terminal of said direct-current ammeter to the second terminal of said parallel inductor-capacitor network, a variable direct-current voltage source having first and second terminals, means for connecting the first terminal of said voltage source to the second terminal of said direct-current ammeter, means for grounding the second terminal of said voltage source, a direct-current voltmeter having first and second terminals, means for connecting the first terminal of said direct-current voltmeter to the first terminal of said voltage source, means for grounding the second terminal of said direct-current voltmeter, a bypass capacitor for connecting the second terminal of said parallel inductor-capacitor network to ground, means for connecting the emitter of said transistor to ground, a first chopper having a common terminal and first and second fixed terminals, a cutoff bias voltage source connected between ground and said first fixed terminal, means for grounding said second fixed terminal, means for connecting the common terminal of said first chopper to said base, a constant voltage feedback amplifier having an input terminal and an output terminal, a variable amplitude oscillator connected to the input terminal of said feedback amplifier, a series connected resistor-capacitor network for connecting the output terminal of said feedback amplifier to said base, a transformer having a primary winding and a secondary winding, said primary winding being connected across the resistor of said resistor-capacitor network, a second chopper operating in synchronism with said first chopper and including a common terminal and first and second fixed terminals, first and second filter capacitors connected respectively to the fixed terminals of said second chopper, a first diode polarized in a first direction for connecting the first fixed terminal of said second chopper to one leg of said secondary, a second diode polarized in the opposite direction for connecting the second fixed terminal of said second chopper to the other leg of said secondary, and a second direct-current ammeter connecting the common terminal of said second chopper to ground.

9. A method for measuring the current gain of a transistor in circuit for a given operating collector current and given operating collector voltage, said transistor including emitter, collector and base terminals, a source of operating potentials including output terminals and means for coupling said output terminals to the terminals of said transistor amplifier, said method comprising deenergizing said source of operating potentials, connecting said emitter terminal to ground, applying via a high impedance a direct-current voltage equal to said given operating collector voltage to said collector, alternately applying a bias voltage to said base terminal of such a magnitude that the current flow from said collector is equal to said given collector operating current and a cutoff direct-current voltage source to said base terminal, applying an alternating-current signal from a variable amplitude alternating-current signal source to said base terminal, measuring while the bias voltage is applied, the alternating current flow in a low impedance circuit connecting said collector terminal to ground to indicate the value of collector alternating current, measuring, while the bias voltage is applied, the alternating current flowing from said variable amplitude alternating-current signal source to establish a first alternating base current, and remeasuring, while the cutoff voltage is applied, the alternating current from said variable amplitude alternating-current signal source to establish a second value of base alternating current so that the current gain of said transistor amplifier may be obtained from the ratio of the measured value collector alternating current and the difference between said first and second values base alternating currents.

10. Apparatus for measuring, in circuit, parameters of a transistor circuit including a transistor having a base, an emitter and a collector, a source of operating potentials including at least two output terminals, said source being deenergized during parameter measurements, and means for connecting said base, emitter and collector to the output terminals of said source of operating potentials, said apparatus comprising grounding means, a source of direct-current voltage, a source of direct current whose magnitude can be varied, a direct-current ammeter including first and second terminals, means for connecting said first terminal to said source of direct current, a bias voltage source switchable between an operating bias and a cutoff bias, a source of alternating-current voltage whose magnitude can be varied, said source of alternating-current voltage having an output terminal, first measuring means connected to said output terminal for measuring the electrical energy transmitted from said output terminal, first junction means for connecting said output terminal to said bias voltage source, a first impedor having a high impedance at the frequency of the alternating-current voltage having first and second ends, means for connecting the first end of said first impedor to said source of direct-current voltage, a second impedor having a low impedance at the frequency of the alternating-current voltage and having first and second ends, second junction means for connecting the second ends of said impedors, second measuring means connected to said second impedor for measuring the alternating current flowing through said second impedor, a plurality of ganged switching means each having a movable contact and first and second fixed contacts, wherein each movable contact is connected to its associated first or second fixed contact at the same time, means for connecting the movable contact of the first of said switching means to said collector, means for connecting the first fixed contact of said first switching means to said second junction means, means for connecting the second fixed contact of said first switching means to said direct-current voltage source, means for connecting the moving contact of the second of said switching means to said base, means for connecting the first fixed contact of said second switching means to said first junction, means for connecting the second fixed contact of said second switching means to the second terminal of said direct-current ammeter, means for connecting the common contact of the third of said switching means to said emitter, means for connecting the first fixed contact of said third switching means to ground, and means for connecting said grounding means to the output terminals of said source of operating potentials when said switching means have their common contacts connected to their associated second fixed contacts.

11. The apparatus of claim 10 wherein said source of direct current includes means for generating an error signal having an amplitude equal to the potential of said base with respect to ground and means for converting said error signal to a direct current signal.

12. The apparatus of claim 10 wherein said source of direct current includes a chopper including a first fixed contact connected to the second terminal of said direct-current ammeter, a second fixed contact connected to ground and a common terminal, rectifier means having an input connected to the common terminal of said chopper and an output connected to the first terminal of said direct-current ammeter.

13. The apparatus of claim 10 wherein said source of alternating-current voltage includes a variable amplitude oscillator having an output and a constant voltage feedback amplifier having an input connected to the output of said variable amplitude oscillator.

14. The apparatus of claim 10 wherein said first measuring means includes a resistor connected to the output of said source of alternating-current voltage, a transformer having a primary winding connected across said resistor and a secondary winding, and an alternating current voltmeter connected to said secondary winding.

15. The apparatus of claim 10 wherein said second measuring means includes an alternating-current voltmeter connected between the junction of the inductor and capacitor of said series inductor-capacitor network and ground.

16. Apparatus for measuring, in situ, parameters of a transistor circuit including a transistor having a base, an emitter and a collector, a source of operating potentials including at least two output terminals, said source being deenergized during parameters measurements, and means for connecting said base, emitter and collector to the output terminals of said source of operating potentials, said apparatus comprising grounding means, a source of direct-current voltage whose magnitude can be varied, a source of direct current whose magnitude can be varied, a first direct-current voltmeter for monitoring the direct-current voltage of said source of direct-current voltage, a first direct-current ammeter including first and second terminals, means for connecting said first terminal to said source of direct current, a second direct-current voltmeter having a first terminal which is grounded and a second terminal, first junction means for joining the second terminals of said second direct-current voltmeter and said direct-current ammeter, a controllably variable direct-current bias voltage source which can be switched between an operating bias and a cutoff bias, a first resistor having first and second ends, means for connecting said first end to said bias voltage source, a variable amplitude oscillator having an output terminal, a constant voltage feedback amplifier having an input terminal connected to the output terminal of said variable amplitude oscillator and an output terminal, a second resistor having a first end connected to said output terminal of said constant voltage feedback amplifier, a transformer having a primary winding connected across said second resistor and a secondary winding, a current indicating means connected across said secondary winding, a first capacitor for connecting the second end of said first resistor to the second end of said second resistor at a second junction means, a parallel inductor-capacitor network having first and second ends, a second direct-current ammeter having first and second terminals, means for connecting the first end of said parallel inductor-capacitor network to the first terminal of said second direct-current ammeter, means for connecting the second terminal of said direct-current ammeter to said source of direct-current voltage, a second alternating-current voltmeter having first and second terminals, means for grounding the first terminal of said second alternating-current voltmeter, a series inductor-capacitor network having first and second ends, means for connecting the first end of said series inductor-capacitor network to ground, means for connecting the junction of the inductor and the capacitor of said series inductor-capacitor network to the second terminal of said second alternating-current ammeter, third junction means for connecting the second ends of said parallel and series inductor-capacitor networks together, a plurality of ganged switching means each having a movable contact and first and second fixed contacts, wherein each movable contact is connected to its associated first or second fixed contact at the same time, means for connecting the movable contact of the first of said switching means to said collector, means for connecting the first fixed contact of said first switching means to said third junction means, means for connecting the second fixed contact of said first switching means to said direct-current voltage source, means for connecting the moving contact of the second of said switching means to said base, means for connecting the first fixed contact of said second switching means to said second junction means, means for connecting the second fixed contact of said second switching means to said first junction means, means for connecting the common contact of the third of said switching means to said emitter, means for connecting the second fixed contact of said third switching means to ground, and means for connecting said grounding means to the output terminals of said source of operating potentials when said switching means have their common contacts connected to their associated second fixed contacts.

17. The apparatus of claim 16 wherein said circuit indicating means includes a chopper having first and second fixed terminals and a common terminal, a first diode connecting said first fixed terminal to one arm of the secondary winding of said transformer and being polarized in a first direction, a second diode connecting said second fixed terminal to the other arm of the secondary winding of said transformer and being polarized in a second and opposite direction, and a third direct-current ammeter connecting the common terminal to ground, and wherein said controllably variable direct-current bias voltage source includes a potentiometer whose arms are connected to ground and a fixed source of direct-current voltage and including a moving contact, a second chopper operating synchronously with said first chopper including first and second fixed contacts and a common contact, the first fixed contact being connected to the moving contact of said potentiometer, the second fixed contact being connected to a voltage sufficient to cut off said transistor and said common contact being connected to said first end of said first resistor.

References Cited

Proceedings of the IRE, November 1956, p. 1554.
Motorola Power Transistor Handbook (first edition), 1961, pp. 159–160.

ARCHIE R. BORCHELT, *Primary Examiner.*

WALTER L. CARLSON, *Examiner.*

E. L. STOLARUN, *Assistant Examiner.*